(12) United States Patent
Mori

(10) Patent No.: US 6,650,487 B2
(45) Date of Patent: Nov. 18, 2003

(54) COLOR IMAGE READOUT LENS AND DEVICE USING THE SAME

(75) Inventor: Masao Mori, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 93 days.

(21) Appl. No.: 10/093,384

(22) Filed: Mar. 11, 2002

(65) Prior Publication Data

US 2002/0167738 A1 Nov. 14, 2002

(30) Foreign Application Priority Data

Mar. 23, 2001 (JP) ........................................ 2001-085465

(51) Int. Cl.⁷ .............................. G02B 9/34; G02B 9/36
(52) U.S. Cl. ........................ 359/772; 359/775; 359/779
(58) Field of Search ................................ 359/771, 772, 359/775, 776, 779

(56) References Cited

U.S. PATENT DOCUMENTS

| | | | | |
|---|---|---|---|---|
| 2,537,912 A | * | 1/1951 | Reiss | 359/775 |
| 2,645,974 A | * | 7/1953 | Ito | 359/753 |
| 2,986,972 A | * | 6/1961 | Miles | 359/355 |
| 3,348,900 A | * | 10/1967 | Hudson | 359/776 |
| 5,858,898 A | | 1/1999 | Nakahara et al. | |
| 5,920,434 A | | 7/1999 | Mori | |
| 6,301,063 B1 | | 10/2001 | Mori | |

FOREIGN PATENT DOCUMENTS

| | | |
|---|---|---|
| JP | 4-311912 | 11/1992 |
| JP | 10-325921 | 12/1998 |

* cited by examiner

*Primary Examiner*—Scott J. Sugarman
*Assistant Examiner*—Darryl J. Collins
(74) *Attorney, Agent, or Firm*—Arnold International; Bruce Y. Arnold

(57) ABSTRACT

A color image readout lens having four lens groups of positive, positive or negative, negative, and positive refractive power, respectively, in order from the object side. The first lens group is formed of a first lens element having a convex surface on the object side. The second lens group has a convex surface of the object side and is formed of a biconvex lens element that is cemented to a biconcave lens element. The third lens group is formed of a fourth lens element that is cemented to a fifth lens element, with the fifth lens element having positive refractive power and a convex surface on the image side. A fourth lens group is formed of a sixth lens element having a convex surface on the image side. Various conditions are satisfied in order to favorably correct the various aberrations.

8 Claims, 15 Drawing Sheets

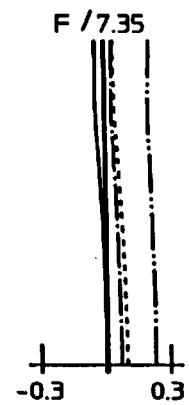
Spherical Aberration
Fig. 3A
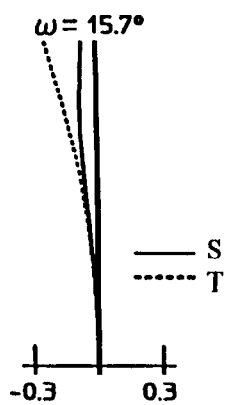
Astigmatism
Fig. 3B
Distortion
Fig. 3C
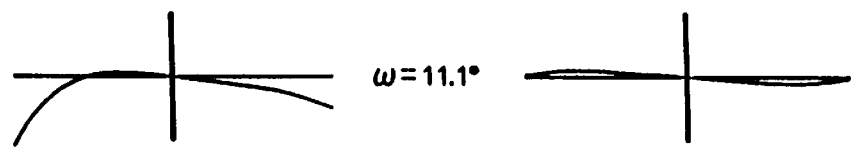
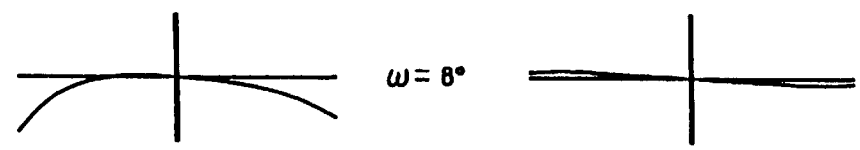
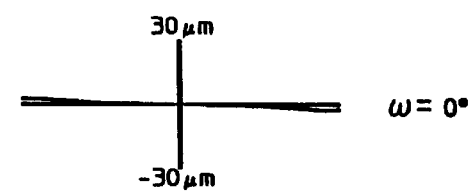
Coma
Fig. 3D Spherical Aberration Astigmatism Distortion Coma

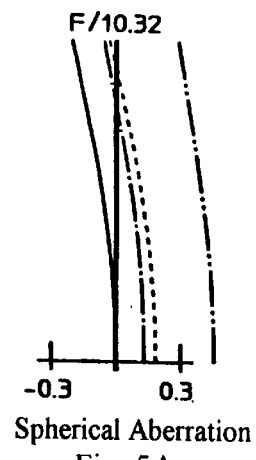
Spherical Aberration
Fig. 5A
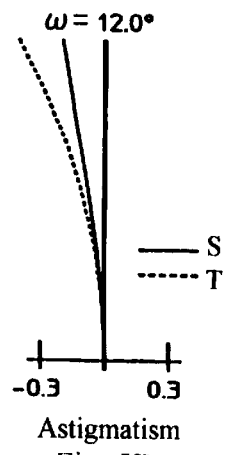
Astigmatism
Fig. 5B
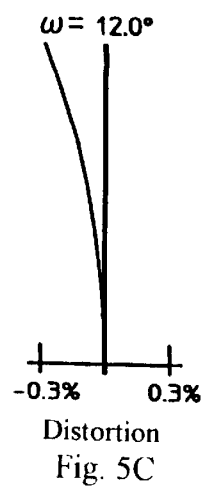
Distortion
Fig. 5C
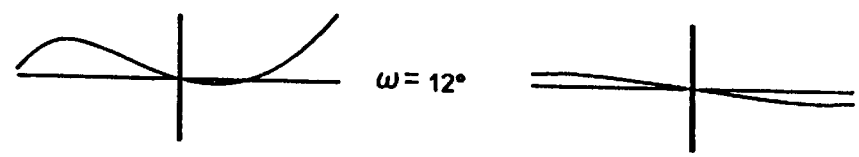
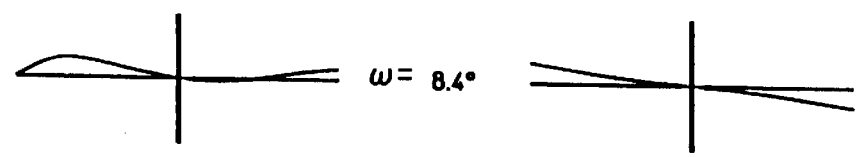
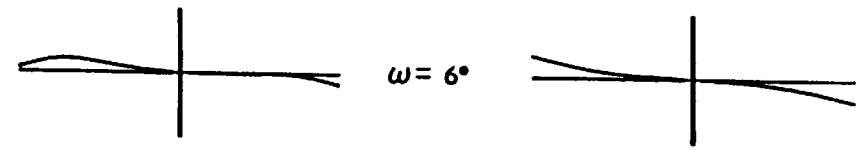
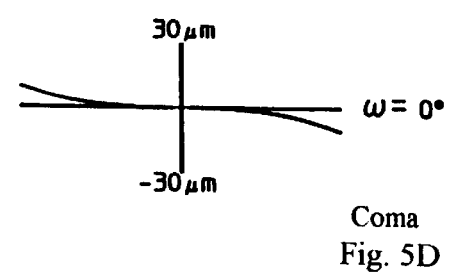
Coma
Fig. 5D

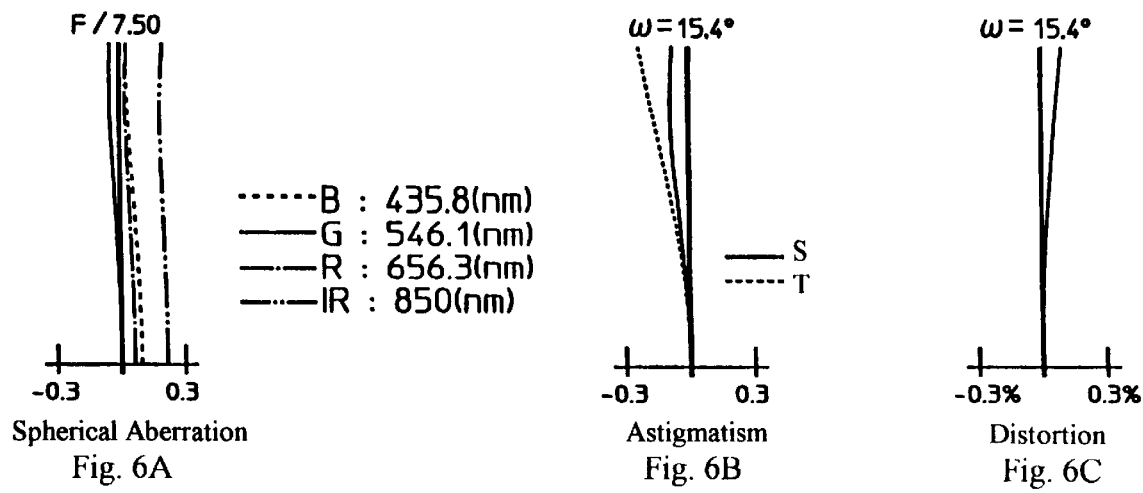
Spherical Aberration
Fig. 6A
Astigmatism
Fig. 6B
Distortion
Fig. 6C
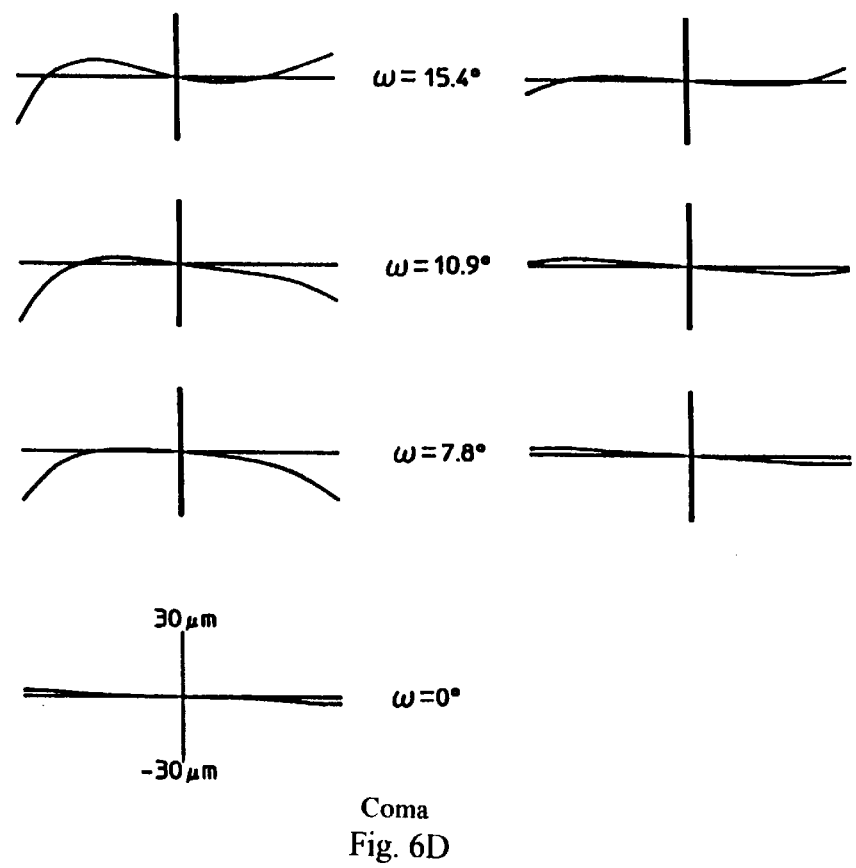
Coma
Fig. 6D

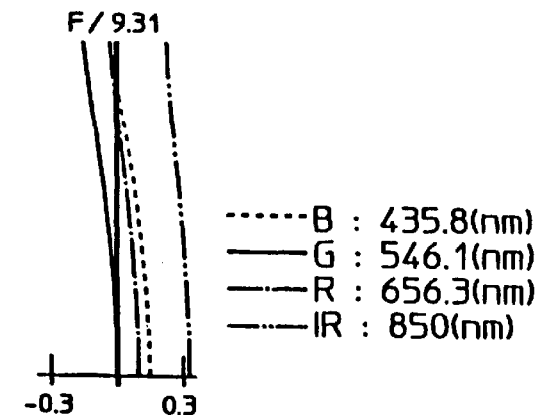
Spherical Aberration
Fig. 7A
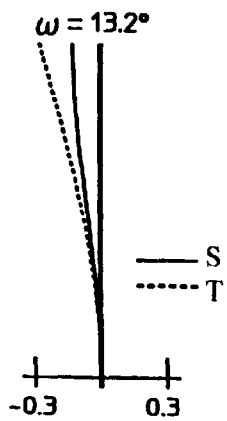
Astigmatism
Fig. 7B
Distortion
Fig. 7C
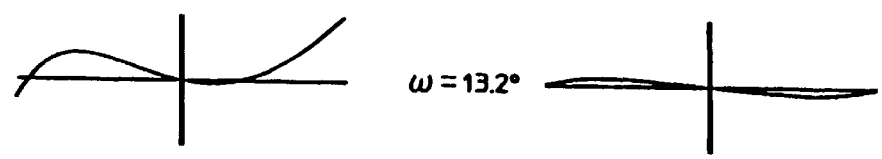
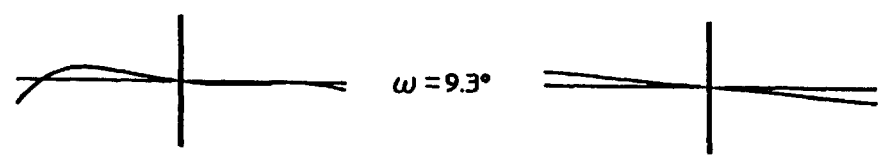
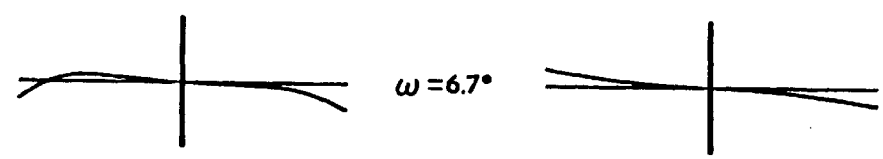
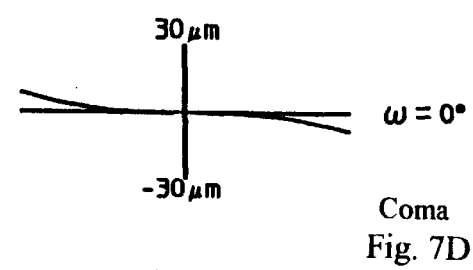
Coma
Fig. 7D

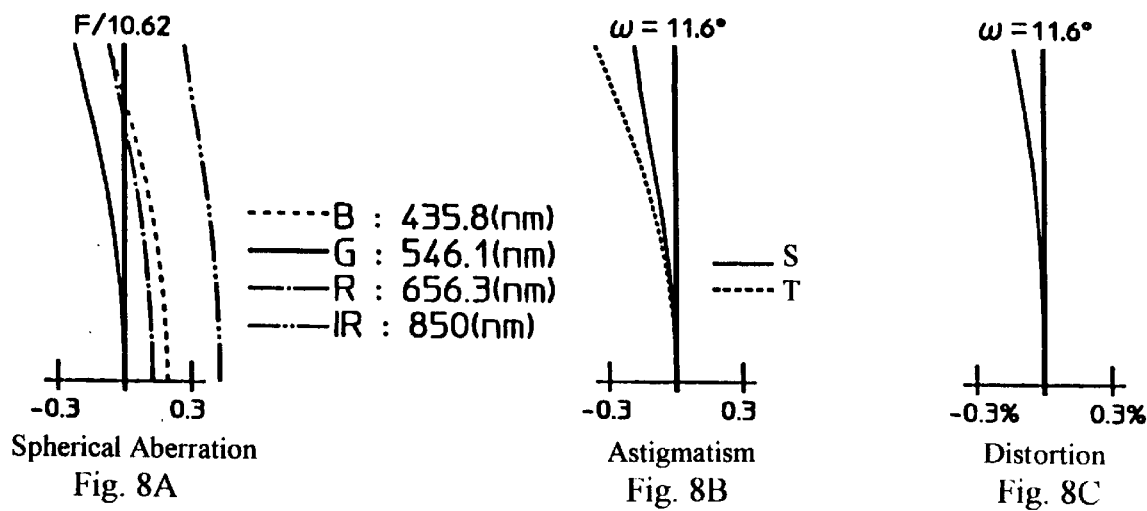
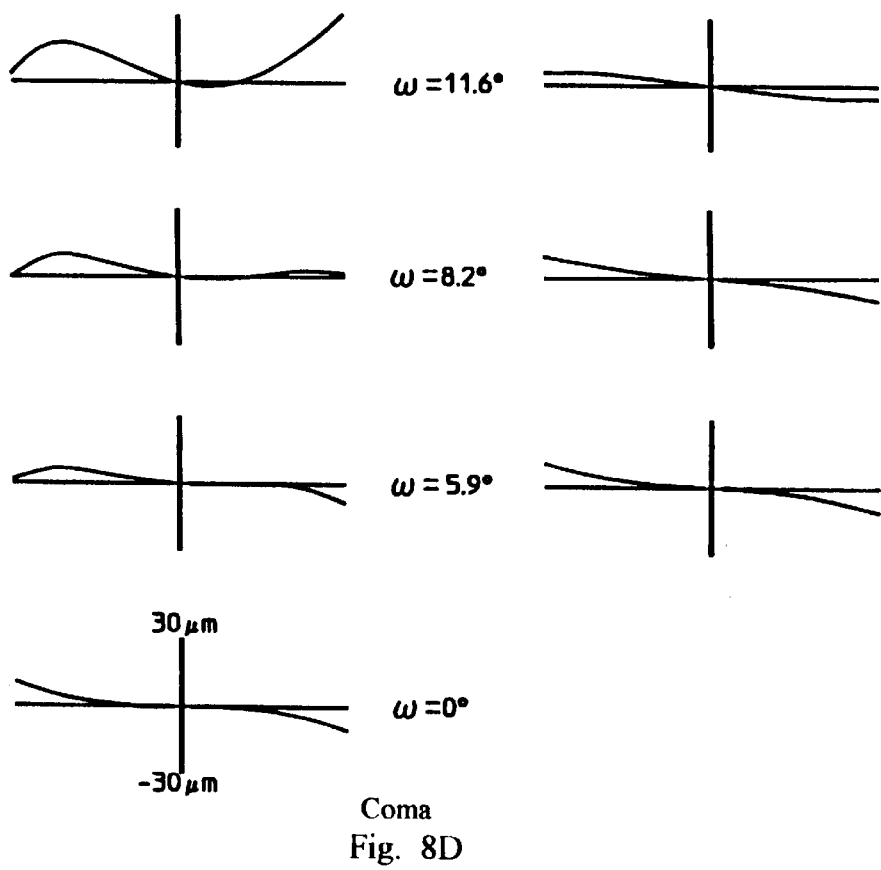

Spherical Aberration

Astigmatism

Distortion

Coma

Spherical Aberration

Astigmatism

Distortion

Coma

Spherical Aberration

Astigmatism

Distortion

Coma

Spherical Aberration

Astigmatism

Distortion

Coma

Spherical Aberration

Astigmatism

Distortion

Coma

Spherical Aberration

Astigmatism

Distortion

Coma

COLOR IMAGE READOUT LENS AND DEVICE USING THE SAME

BACKGROUND OF THE INVENTION

Recently, developing machines called mini labs or digital labs have been popularized. They do not directly print an image from film onto paper, but rather, perform various steps in processing a film image by using a lens and a solid-state image pick-up element, such as a CCD array. An image is indirectly copied onto paper by projecting the film image using the lens onto the CCD array, where it is captured and used to modulate a laser beam that writes the image onto paper as is done in a laser printer. In such developing machines, an image readout optical system having higher resolution for imaging the film image onto the solid-state image pick-up element has been desired in order to keep pace with the rapid development of higher resolution CCD arrays.

When a color original is read, for example, by a three-line CCD array, it is desired that chromatic aberrations be favorably corrected so that the imaging positions for the red (R), green (G) and blue (B) color components are incident onto the appropriate line of the three-line CCD array. More specifically, the colors must be imaged so that they have high contrast by reducing the axial chromatic aberration and the lateral color of the R, G, and B color components in order to achieve proper registration of these color components over the entire image field onto the respective line of the detectors. Even if the amount of axial chromatic aberration is small, the positions of the image points will deviate with a change in color. If the R, G, and B image positions are mis-registered with respect to the position of the sensors of the three-line CCD array, full color images having reduced contrast will result even if high contrast performance is obtained separately for each color. Thus, mechanisms which detect the focus separately for each color are needed in order to maintain proper registration of the focus positions.

In addition, there is a requirement that very fine blemishes or dust particles on the surface of the film that form image artifacts by being incorporated as image information onto the paper, be minimized. Corresponding to this requirement, an attempt has been made to detect very fine blemishes or dust particles using near-infrared light and to remove these unnecessary images by electronic image processing.

Accordingly, it is desired that a color image readout lens provide a high resolution image not only in the visible region for obtaining the image information, but also in the near-infrared wavelength region.

If f is the focal length of a lens and $\beta$ ($\beta<0$) is the magnification of the lens, the amount of axial chromatic aberration $\Delta S$ is proportional to $(1-\beta)^2 \cdot f$. Thus, the longer the focal length f or the greater the absolute value of $(1-\beta)$, the larger is the amount $\Delta S$. This property is significant, and the correction of chromatic aberration on the optical axis is impossible unless a glass having anomalous dispersion is used. It is particularly difficult to make the R, G, and B color components have high-contrast over an expanded region. Therefore, a glass of high anomalous dispersion must be effectively used in order to correct large axial chromatic aberrations.

The higher the anomalous dispersion of the glass, the higher the correction effect. And, the stronger the refractive power of the lens, the stronger the correction needed. On the other hand, if the refractive power is too strong, the occurrence of other aberrations increases and this causes a deterioration in the quality of the image.

It is desirable to correct the axial chromatic aberration by ensuring appropriate values for the sum of the products $\Sigma \phi_i \cdot \delta \theta_i$, where $\phi_i$ is the refractive power (i.e., equals $1/f_i$) and $\delta \theta_i$ is the anomalous dispersion of the $i^{th}$ lens element.

Many proposals for making a lens achromatic have been set forth, such as the one described in Japanese Laid Open Patent Application H4-311912. However, almost all of these proposals form reduced images having a magnification in the range −0.1 to −0.2 of that used, for instance, in a scanner. In a developing machine as described above, it is difficult to correct large axial chromatic aberration when approaching a magnification near unity. For example, it is difficult to obtain good performance when the magnification is about 0.8.

On the other hand, a technique described in Japanese Laid Open Patent Application H10-325921 has been used for correcting aberrations in the near-infrared region as well as in the visible region. However, this technique does not use a diaphragm at the center of the lens system, as is commonly done in order to obtain symmetry and thereby reduce certain aberrations so as to provide good optical performance. Therefore aberration fluctuations over the range of magnification increase, making good optical performance difficult to obtain over a wide range of magnification.

BRIEF SUMMARY OF THE INVENTION

The present invention relates to a lens for reading a color image or a color original, and to a device which uses such a lens. More particularly, the object of the present invention is to provide a color image readout lens which reduces a negative film image or positive film image by a magnification factor mf, with mf being in the range $-0.3 \leq mf \leq -0.85$, which has an f number $F_{NO}$ in the range of $7.3 \leq F_{NO} \leq 10.2$, and which simultaneously provides good visible and near-infrared imaging resolution. In addition, the invention is to a device which uses such an image readout lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show the spherical aberration, astigmatism, distortion and coma, respectively, of the color image readout lens of Embodiment 1 at a magnification of −0.30;

FIGS. 5A–5D show the spherical aberration, astigmatism, distortion and coma, respectively, of the color image readout lens of Embodiment 1 at a magnification of −0.85;

FIGS. 6A–6D show the spherical aberration, astigmatism, distortion and coma, respectively, of the color image readout lens of Embodiment 2 at a magnification of −0.30;

FIGS. 7A–7D show the spherical aberration, astigmatism, distortion and coma, respectively, of the color image readout lens of Embodiment 2 at a magnification of −0.62;

FIGS. 8A–8D show the spherical aberration, astigmatism, distortion and coma, respectively, of the color image readout lens of Embodiment 2 at a magnification of −0.85;

DETAILED DESCRIPTION

Figure 1:
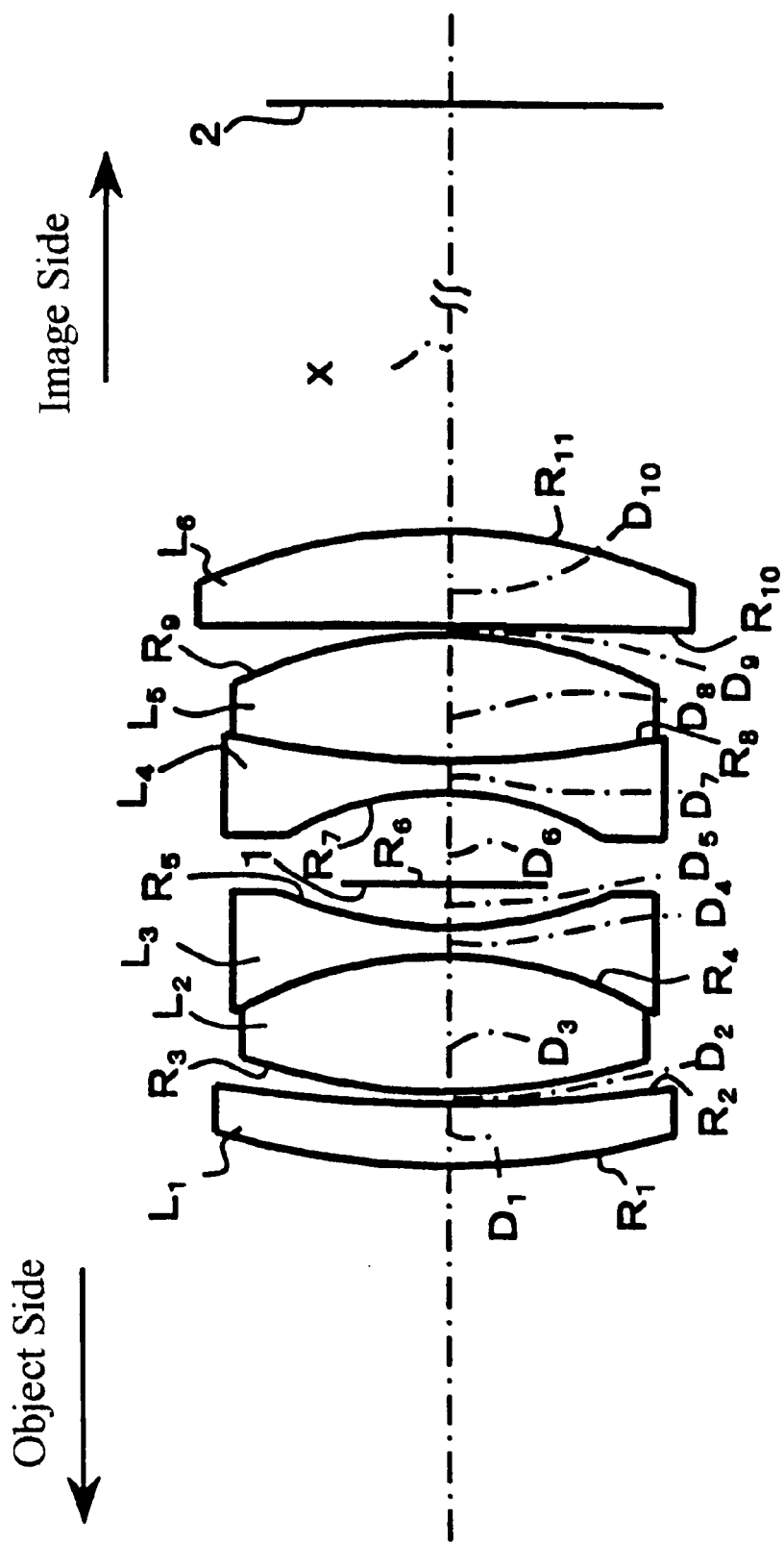
FIG. 1 shows the basic lens element configuration of a color image readout lens relating to Embodiments 1, 3 and 4.

The color image readout lens of the present invention is formed of four lens groups, in order from the object side, as follows (see FIG. 1): a first lens group formed of a first lens element $L_1$ of positive refractive power having a convex surface on the object side; a second lens group of positive or negative refractive power that is formed of a second lens element $L_2$ that is biconvex and cemented to a third lens element $L_3$ that is biconcave; a third lens group of negative refractive power that is formed of a fourth lens element $L_4$ that is biconcave and cemented to a fifth lens element $L_5$ that is biconvex; and a fourth lens group formed of a sixth lens element $L_6$ of positive refractive power and having a convex surface on the image side. Moreover, a diaphragm 1 is arranged between the third lens element $L_3$ and the fourth lens element $L_4$. In addition, the following Conditions (1)–(6) are preferably satisfied:

$$33 < v_i < 45 \qquad \text{Condition (1)}$$

$$-0.012 < \delta\theta_i < -0.004 \qquad \text{Condition (2)}$$

$$0.0006 < \Sigma\phi_i \cdot \delta\theta_i < 0.0020 \qquad \text{Condition (3)}$$

$$n_2 > n_3 \qquad \text{Condition (4)}$$

$$5 < v_2 - v_3 < 15 \qquad \text{Condition (5)}$$

$$0.02 < (D_6 - D_5)/f < 0.08 \qquad \text{Condition (6)}$$

where $v_i$ is the Abbe number of the $i^{th}$ lens element, in order from the object side, and the condition is satisfied only if both $v_3$ and $v_4$ are within the stated range of values, $\delta\theta_i$ is the anomalous dispersion of the $i^{th}$ lens element, in order from the object side, and the condition is satisfied if either $\delta\theta_3$ or $\delta\theta_4$ is within the stated range of values, $\Sigma\phi_i \cdot \delta\theta_i$ represents the sum of products of the refractive power $\phi_i (=1/f_i)$ times the anomalous dispersion $\delta\theta_i$ of the $i^{th}$ lens element, in order from the object side, where i=3, 4, $n_2$ represents the refractive index of the second lens element, in order from the object side, $n_3$ represents the refractive index of the third lens element, in order from the object side, $v_2$ is the Abbe number at the d line of the second lens element, in order from the object side, $v_3$ is the Abbe number at the d line of the third lens element, in order from the object side, $D_5$ is the on-axis spacing between the third lens element, in order from the object side, and the diaphragm, and $D_6$ is the on-axis spacing between the diaphragm and the fourth lens element, in order from the object side.

The anomalous dispersion $\delta\theta$ represents a deviation from a reference line of the partial dispersion ratio $\theta_{g,d}$ for or the g-d line. In more detail, the partial dispersion ratio $\theta_{g,d}$ (i.e., for the g-d line) is given by $\theta_{g,d}=(ng-nd)/(nF-nC)$, and the anomalous dispersion $\delta\theta$ is the difference in ordinate positions of the partial dispersion ratio of a material and a line which connects the partial dispersion ratios calculated by plotting $\theta_{g,d}$ versus the Abbe number $v_d$ (at the d line) for the standard optical materials K7 and F2. An example of how the anomalous dispersion of a material is determined in the case where the partial dispersion is for the g, F lines is given in U.S. Pat. No. 5,858,898, which is hereby incorporated by reference. See FIG. 1 thereof and the accompanying discussion. The anomalous dispersion $\theta_{g,d}$ (i.e, using the g and d lines) is determined in a manner similar to the technique illustrated in FIG. 1 of the '898 patent for $\theta_{g,F}$ (i.e., using the g and F lines), but with the ordinate being $\theta_{g,d}$ rather than $\theta_{g,F}$.

Moreover, it is preferable that the anomalous dispersion of the two negative lens elements (i.e., the third lens element and the fourth lens element, in order from the object side) in the near-infrared region satisfy the following Condition (7):

$$0.03 < \delta P_i < 0.06 \ (i=3,4) \qquad \text{Condition (7)}$$

where $\delta P_3$ is the anomalous dispersion of the negative lens element of the second lens group, in the near-infrared region (i.e., the deviation of the partial dispersion ratio relative to the C-t line from the C-t base line), and $\delta P_4$ is the anomalous dispersion of the negative lens element of the third lens group, in the near-infrared region (i.e., the deviation of the partial dispersion ratio relative to the C-t line from the C-t base line).

Furthermore, it is preferable that two or more lens elements of the positive lens elements, namely, of the first lens element, the second lens element, the fifth lens element and the sixth lens element, satisfy the following Condition (8):

$$\chi_i \cdot \phi_i < 2.6 \qquad \text{Condition (8)}$$

where the subscript i represents the lens elements 1, 2, 5 or 6 and the condition is satisfied if two lens elements or more are within the above limit of 2.6, $\phi_i$ is the refractive power (equals $1/f_i$) of the $i^{th}$ lens element, in order from the object side (i=1, 2, 5, or 6), $\chi_i$ is the temperature coefficient of the lens element, defined by the following equation $$\chi_i = \alpha_i - (dn/dT)_i \cdot (1/(n_i - 1))$$

with $\alpha_i$ being the linear expansion coefficient of the $i^{th}$ lens element, in order from the object side (i=1, 2, 5, or 6), $(dn/dT)_i$ being the change of refractive index with temperature, of the $i^{th}$ lens element, in order from the object side (i=1, 2, 5, or 6), and $n_i$ being the index of refraction of the $i^{th}$ lens element, in order from the object side (i=1, 2, 5, or 6).

Generally, the axial chromatic aberrations become large in an optical system having an absolute value of magnification near unit or higher. If a material of a high anomalous dispersion is used to enhance the refractive power of a lens, the effect is large for correcting the axial chromatic aberration. However, if a strong refractive power is to be obtained, the radius of curvature of the lens surface must be small. Aberrations such as spherical aberration, coma and curvature of field are generated by such a surface, and the heights of the rays on the surface will change with amount of magnification. Thus, in an optical system having an absolute value of magnification near unit or higher, it is difficult to obtain good optical performance over a wide range of magnification.

Accordingly, in the color image readout lens and device of the present invention, the curvature of field and axial chromatic aberration are corrected by using a glass of high anomalous dispersion for the negative lens elements of the cemented lenses that form the Gauss-type lens, and by using, for the glass of the positive lens element of the cemented lens on the object side which is cemented to this negative lens element, a glass having an index of refraction and an Abbe number that are even higher than that of the negative lens element. In this way, distortion and lateral color are corrected and the aberration changes due to changes in magnification are suppressed by maintaining approximate symmetry before and after the diaphragm.

In addition to satisfying Condition (6) above, the distortion and lateral color will be less if the following more strict condition is satisfied:

$$0.028 < (D_6 - D_5)/f < 0.055 \qquad \text{Condition (9)}.$$

The invention will first be discussed in general terms with reference to a drawing figure for one embodiment.

FIG. 1 shows the basic lens element configuration of a color image readout lens relating to Embodiment 1 of the present invention. The color image readout lens of this embodiment includes, in sequential order from the object side, a first lens element $L_1$ of positive refractive power having a convex surface on the object side, a lens that is formed by cementing a second lens element $L_2$ that is biconvex to a third lens element $L_3$ that is biconcave, a diaphragm 1, a lens of negative refractive power that is formed by cementing a fourth lens element $L_4$ that is biconcave to a fifth lens element $L_5$ that is biconvex, and a sixth lens element $L_6$ of positive refractive power having a convex surface on the image side. Moreover, a diaphragm 1 is arranged between the third lens element $L_3$ and the fourth lens element $L_4$.

Light is imaged by this color image readout lens onto an image pick-up surface 2 of a solid-state image pick-up element, such as a CCD array.

The purpose of the Conditions (1)–(8) will now be explained.

Condition (1) specifies the use of a material of a high anomalous dispersion, in the negative direction, in making both of the negative lens elements of the color image readout lens, and are for correcting chromatic aberration, especially in the secondary spectra. More specifically, Condition (1) requires that the third and fourth lens elements $L_3$, $L_4$ of negative refractive power be made of glass having an anomalous dispersion, so that these lens elements are able to correct for large axial chromatic aberrations occurring at magnifications near unity.

Condition (2) requires that the optical material used to make at least one of these two lens elements $L_3$, $L_4$ have an anomalous dispersion within the stated range so as to suppress an increase of other aberrations such as spherical aberration, coma, and so on. If the above Conditions (1) and (2) are not satisfied, the refractive power for correcting the large axial chromatic aberration that occurs near unity magnification becomes too strong, negative spherical aberration and coma increase, and high-resolution performance is hard to obtain.

Condition (3) specifies the sum of products of the refractive power $\phi_i$ ($=1/f_i$) times the anomalous dispersion $\delta\theta_i$ of the third and fourth lens elements $L_3$, $L_4$ of negative refractive power. If the lower limit of Condition (3) is not satisfied, axial chromatic aberration will not be sufficiently corrected resulting in making it difficult to obtain good image quality of the R, G, B components in the visible region, and further, making it difficult to obtain good imaging in the near-infrared wavelengths. On the other hand, if the upper limit of Condition (3) is not satisfied, the radii of curvature of the lens surfaces decrease. If a lens which forms a bright image is to be obtained, the smaller radii of curvature causes excess negative spherical aberration, and increases both the coma and curvature of field, making a good image quality difficult to obtain.

Conditions (4) and (5) specify the ideal range of the indexes of refraction and the Abbe numbers of the second lens element $L_2$ and third lens element $L_3$, in order from the object side, which form the cemented lens on the object side of the diaphragm 1, in order to sufficiently correct for chromatic aberration and curvature of field. Favorable correction of chromatic aberration and curvature of field can be achieved, even if each component lens element possesses a strong refractive power, by selecting the materials of the second lens element and the third lens element so as to satisfy these conditions.

Condition (6) corrects the distortion and the lateral color of the color image readout lens of the invention by specifying that the diaphragm 1 be positioned within an asymmetric range of locations that is fairly symmetrical with respect to the cemented lens elements that form the Gauss-type lens portion of the color image readout lens. If the lower limit of Condition (6) is not satisfied, the difference in height of a ray incident upon the third lens group at various field angles decreases. Thus, if a lens with a small radius of curvature is not arranged on the object side of the diaphragm 1, an effective correction of distortion and lateral color that corresponds to the field angle becomes difficult to obtain. If the radii of curvature of the lens elements on the object side of the diaphragm 1 decreases, high-order aberrations such as coma, etc. are generated and good optical performances becomes difficult to obtain. On the other hand, if the upper limit of Condition (6) is not satisfied, the change of aberrations with change of magnification increases, making it difficult to provide favorable correction of aberrations over a wide range of magnification.

Condition (7) specifies that the material of the third and fourth lens elements of negative refractive power have a high anomalous dispersion in the near-infrared region, in order to obtain a high performances in the near-infrared region. For example, if a good performance is to be obtained at a wavelength t=940 nm, it is vital that a lens-forming material is selected to satisfy this Condition (7). If the lower limit of Condition (7) is not satisfied, the chromatic aberration correction in the near-infrared region will be insufficient. If the upper limit of Condition (7) is not satisfied, the correction becomes excessive. Thus, good optical performance is difficult to obtain unless Condition (7) is satisfied.

Condition (8) is for reducing the change of focus position due to temperature change. Generally, if a glass material having anomalous dispersion is used in the negative lens elements, the temperature coefficient $\chi$ takes a relatively small value. Thus, the focus shift caused by the temperature change becomes hard to reduce. Accordingly, it is vital that a material having a relatively small linear expansion coefficient $\alpha$ and a large positive ratio of change in refractive index with temperature dn/dT be selected as the lens-forming material of the positive lens elements. Namely, the focus shift caused by the temperature change can be reduced by selecting a material having a small temperature coefficient $\chi$ as the lens-forming material of the positive lens elements (i.e., $L_1$, $L_2$, $L_5$ and $L_6$).

Several embodiments of the present invention will now be set forth in detail.

Embodiment 1

The basic lens element configuration of the color image readout lens of Embodiment 1 is shown in FIG. 1. As this Figure was discussed above in discussing the invention in general, further description here will be omitted.

Table 1 below lists the surface number # in order from the object side, the radius of curvature R (in mm) of each surface, the on-axis spacing D (in mm) between surfaces, as well as the index of refraction $n_d$ and the Abbe number $\nu_d$ (both at the d line), the anomalous dispersion $\delta\theta$, the linear expansion coefficient $\alpha$, and the change in index of refraction with change in temperature dn/dT of each of the optical elements of Embodiment 1. In the middle portion of the table is listed the focal length f of the color image readout lens, and in the bottom portion of the table are listed the values of the above Conditions (1)–(9) which are applicable to this embodiment.

TABLE 1

| # | R | D | $n_d$ | $\nu_d$ | $\delta\theta$ | $\alpha$ | dn/dT |
|---|---|---|---|---|---|---|---|
| 1 | 15.567 | 3.07 | 1.62299 | 58.2 | −0.0018 | 65 | 1.9 |
| 2 | 56.751 | 0.50 | | | | | |
| 3 | 21.993 | 3.45 | 1.67003 | 47.2 | −0.0028 | 68 | 4.2 |
| 4 | −73.525 | 0.95 | 1.61293 | 37.0 | −0.0005 | 83 | 3.7 |
| 5 | 10.971 | 1.97 | | | | | |
| 6 | ∞ (stop) | 4.00 | | | | | |
| 7 | −8.796 | 0.97 | 1.61340 | 44.3 | −0.0115 | 52 | 4.9 |
| 8 | 53.995 | 3.94 | 1.62299 | 58.2 | −0.0018 | 65 | 1.9 |
| 9 | −12.799 | 0.25 | | | | | |
| 10 | ∞ | 2.68 | 1.62299 | 58.2 | −0.0018 | 65 | 1.9 |
| 11 | −28.929 | | | | | | | f = 44.44
Condition (1) values: $\nu_3$ = 37.0 $\nu_4$ = 44.3
Condition (2) values: $\delta\theta_3$ = −0.0005 $\delta\theta_4$ = −0.0115
Condition (3) value: $\Sigma\phi \cdot \delta\theta$ = 0.0007
Condition (4) values: $n_2$ = 1.67003 $n_3$ = 1.61293
Condition (5) value: $\nu_2 - \nu_3$ = 10.2
Condition (6) and (9) value: $(D_6 - D_5)/f$ = 0.047
Condition (7) value: $\delta P_4$ = 0.039
Condition (8) values: $\chi_1 \cdot \phi_1$ = 1.85 $\chi_2 \cdot \phi_2$ = 2.41 $\chi_6 \cdot \phi_6$ = 1.33

By comparing the values listed in the bottom portion of the table with the above Conditions (1)–(9), it is evident that the above values satisfy each of Conditions (1)–(9).

Figure 4A:
FIGS. 4A–4D show the spherical aberration, astigmatism, distortion and coma, respectively, of the color image readout lens of Embodiment 1 at a magnification of −0.62.
Figure 4B:
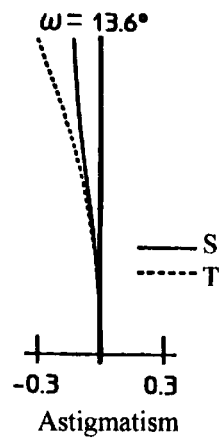
Figure 4C:
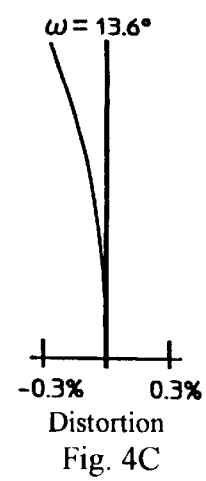
Figure 4D:
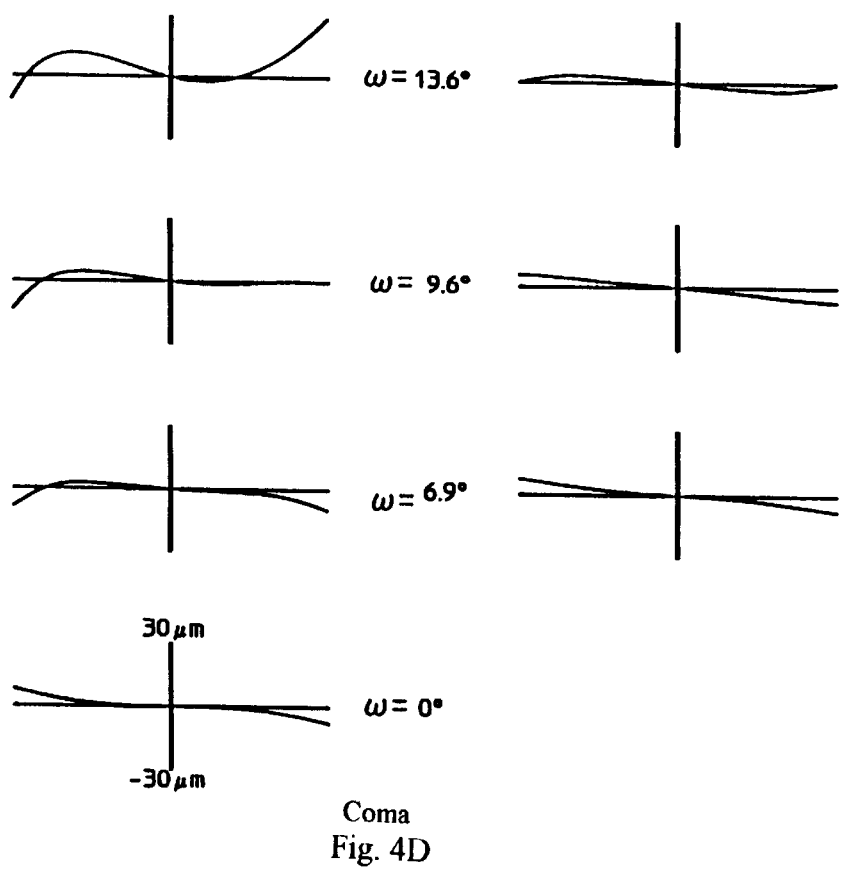

FIGS. 3A–3D show the spherical aberration, astigmatism, distortion and coma, respectively, of the color image readout lens of Embodiment 1 at a magnification of −0.30, FIGS. 4A–4D show these same aberrations, respectively, at a magnification of −0.62, and FIGS. 5A–5D show these same aberrations, respectively, at a magnification of −0.85. In these figures ω is the half-image angle. The spherical aberration is given for the three visible wavelengths R, G, B and the one near-infrared IR wavelength indicated. In FIGS. 3B, 4B and 5B, the astigmatism is illustrated for both the sagittal S and tangential T image planes. As is evident from FIGS. 3A, 4A, and 5A, axial chromatic aberration is effectively corrected so that a color image readout lens having high performance over a wide range of wavelengths is achieved.

Embodiment 2

Figure 2:
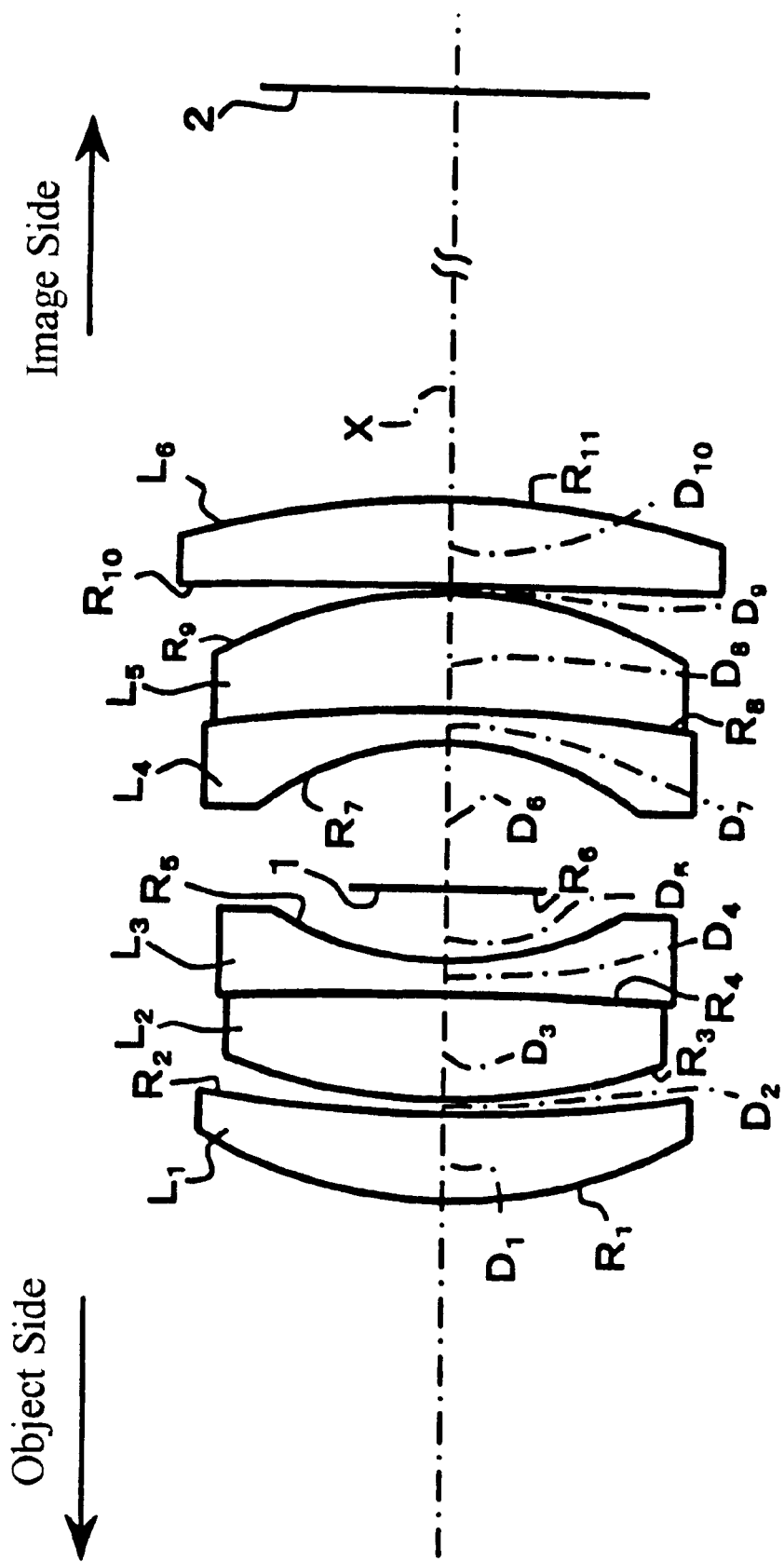
FIG. 2 shows the basic lens element configuration of a color image readout lens of Embodiment 2.

The basic lens element configuration of the color image readout lens of Embodiment 2 is shown in FIG. 2. The configuration is similar to that of Embodiment 1 except, in this embodiment, the fourth lens element $L_4$ is a negative meniscus lens with its convex surface on the image side, and the fifth lens element $L_5$ is a positive meniscus lens with is convex surface on the image side.

Table 2 below lists the surface number # in order from the object side, the radius of curvature R (in mm) of each surface, the on-axis spacing D (in mm) between surfaces, as well as the index of refraction $n_d$ and the Abbe number $\nu_d$ (both at the d line), the anomalous dispersion $\delta\theta$, the linear expansion coefficient $\alpha$, and the change in index of refraction with change in temperature dn/dT of each of the optical elements of Embodiment 2. In the middle portion of the table is listed the focal length f of the color image readout lens, and in the bottom portion of the table are listed the values of the above Conditions (1)–(9) which are applicable to this embodiment.

TABLE 2

| # | R | D | $n_d$ | $\nu_d$ | $\delta\theta$ | $\alpha$ | dn/dT |
|---|---|---|---|---|---|---|---|
| 1 | 13.925 | 2.47 | 1.61800 | 63.3 | 0.0071 | 101 | −3.6 |
| 2 | 43.134 | 0.45 | | | | | |
| 3 | 18.265 | 3.00 | 1.67003 | 47.2 | −0.0028 | 68 | 4.2 |
| 4 | −134.975 | 0.95 | 1.61293 | 37.0 | −0.0005 | 83 | 3.7 |
| 5 | 9.882 | 2.00 | | | | | |
| 6 | ∞ (stop) | 4.18 | | | | | |
| 7 | −8.723 | 0.97 | 1.61340 | 44.3 | −0.0115 | 52 | 4.9 |
| 8 | −44.599 | 3.34 | 1.62299 | 58.2 | −0.0018 | 65 | 1.9 |
| 9 | −13.043 | 0.25 | | | | | |
| 10 | −275.756 | 2.46 | 1.61800 | 63.3 | 0.0071 | 101 | −3.6 |
| 11 | −25.370 | | | | | | | f = 44.79
Condition (1) values: $\nu_3$ = 37.0 $\nu_4$ = 44.3
Condition (2) values: $\delta\theta_3$ = −0.0005 $\delta\theta_4$ = −0.0115
Condition (3) value: $\Sigma\phi \cdot \delta\theta$ = 0.0009
Condition (4) values: $n_2$ = 1.67003 $n_3$ = 1.61293
Condition (5) value: $\nu_2 - \nu_3$ = 10.2
Condition (6) and (9) value: $(D_6 - D_5)/f$ = 0.049
Condition (7) value: $\delta P_4$ = 0.039
Condition (8) values: $\chi_2 \cdot \phi_2$ = 2.19 $\chi_5 \cdot \phi_5$ = 2.18 $\chi_6 \cdot \phi_6$ = 2.37

By comparing the values listed in the bottom portion of the table with the above Conditions (1)–(9), it is evident that the above values satisfy each of Conditions (1)–(9).

FIGS. 6A–6D show the spherical aberration, astigmatism, distortion and coma, respectively, of the color image readout lens of Embodiment 2 at a magnification of −0.30, FIGS. 7A–7D show these same aberrations, respectively, at a magnification of −0.62, and FIGS. 8A–8D show these same aberrations, respectively, at a magnification of −0.85. In these figures ω is the half-image angle. The spherical aberration is given for the three visible wavelengths R, G, B and the one near-infrared wavelength IR as indicated. In FIGS. 6B, 7B and 8B, the astigmatism is illustrated for both the sagittal S and tangential T image planes. As is evident from FIGS. 6A, 7A, and 8A, axial chromatic aberration is effectively corrected so that a color image readout lens having high performance over a wide range of wavelengths is achieved.

Embodiment 3

The color image readout lens of this embodiment is similar in its basic lens element configuration to that of Embodiment 1 as shown in FIG. 1, except that in this embodiment the sixth lens element $L_6$ is a positive meniscus lens with its convex surface on the image side.

Table 3 below lists the surface number # in order from the object side, the radius of curvature R (in mm) of each surface, the on-axis spacing D (in mm) between surfaces, as well as the index of refraction $n_d$ and the Abbe number $v_d$ (both at the d line), the anomalous dispersion $\delta\theta$, the linear expansion coefficient $\alpha$, and the change in index of refraction with change in temperature dn/dT of each of the optical elements of Embodiment 3. In the middle portion of the table is listed the focal length f of the color image readout lens, and in the bottom portion of the table are listed the values of the above Conditions (1)–(9) which are applicable to this embodiment.

TABLE 3

| # | R | D | $n_d$ | $v_d$ | $\delta\theta$ | $\alpha$ | dn/dT |
|---|---|---|---|---|---|---|---|
| 1 | 23.335 | 1.70 | 1.74400 | 44.8 | −0.0041 | 74 | 2.9 |
| 2 | 41.895 | 0.37 | | | | | |
| 3 | 18.130 | 3.85 | 1.74400 | 44.8 | −0.0041 | 74 | 2.9 |
| 4 | −11.972 | 0.85 | 1.65412 | 39.6 | −0.0056 | 46 | 6.3 |
| 5 | 12.422 | 1.20 | | | | | |
| 6 | ∞ (stop) | 2.60 | | | | | |
| 7 | −8.411 | 0.86 | 1.61310 | 44.4 | −0.0103 | 52 | 4.9 |
| 8 | 26.924 | 3.60 | 1.48749 | 70.2 | 0.0020 | 90 | −0.9 |
| 9 | −13.118 | 0.25 | | | | | |
| 10 | −567.783 | 2.75 | 1.60738 | 56.8 | −0.0010 | 65 | 3.9 |
| 11 | −16.788 | | | | | | | f = 43.89
Condition (1) values: $v_3$ = 39.6 $v_4$ = 44.4
Condition (2) values: $\delta\theta_3$ = −0.0056 $\delta\theta_4$ = −0.0103
Condition (3) value: $\Sigma\phi \cdot \delta\theta$ = 0.0017
Condition (4) values: $n_2$ = 1.74400 $n_3$ = 1.65412
Condition (5) value: $v_2 - v_3$ = 5.1
Condition (6) and (9) value: $(D_6 - D_5)/f$ = 0.032
Condition (7) value: $\delta P_3$ = 0.040 $\delta P_4$ = 0.048
Condition (8) values: $\chi_1 \cdot \phi_1$ = 1.03 $\chi_6 \cdot \phi_6$ = 2.06

By comparing the values listed in the bottom portion of the table with the above Conditions (1)–(9), it is evident that the above values satisfy each of Conditions (1)–(9).

Figure 9A:
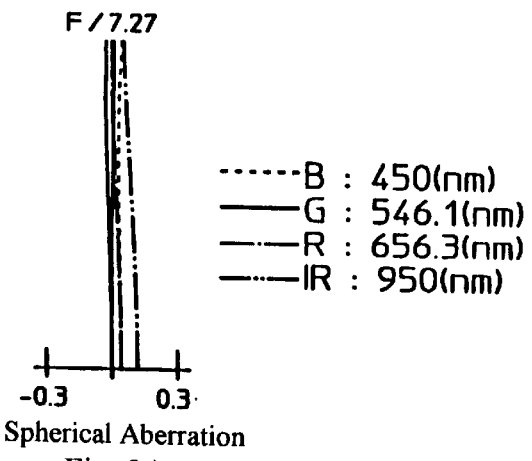
FIGS. 9A–9D show the spherical aberration, astigmatism, distortion and coma, respectively, of the color image readout lens of Embodiment 3 at a magnification of −0.27.
Figure 9B:
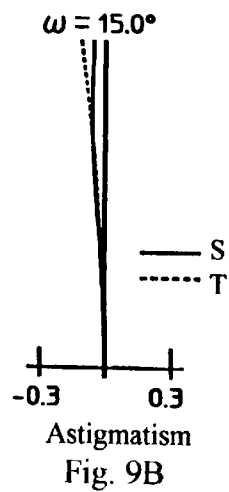
Figure 9C:
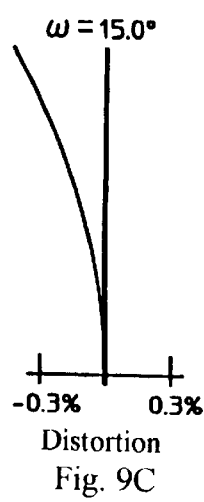
Figure 9D:
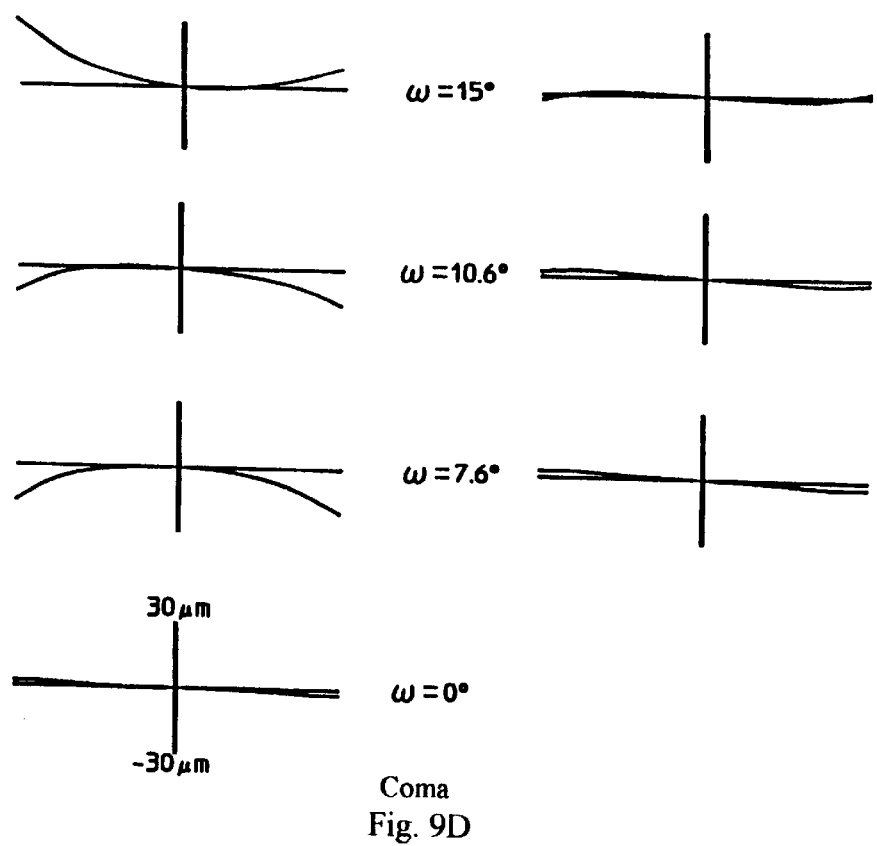
Figure 10A:
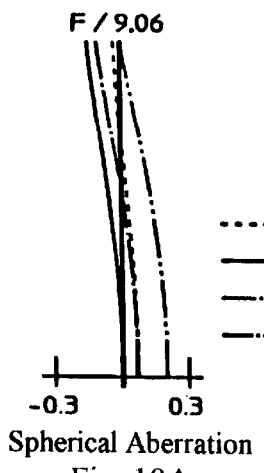
FIGS. 10A–10D show the spherical aberration, astigmatism, distortion and coma, respectively, of the color image readout lens of Embodiment 3 at a magnification of −0.62.
Figure 10B:
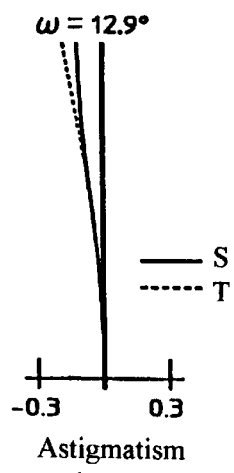
Figure 10C:
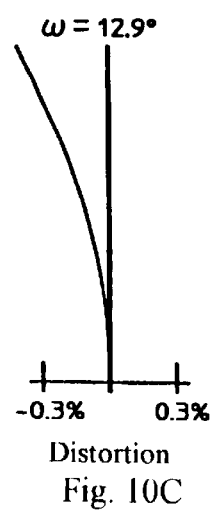
Figure 10D:
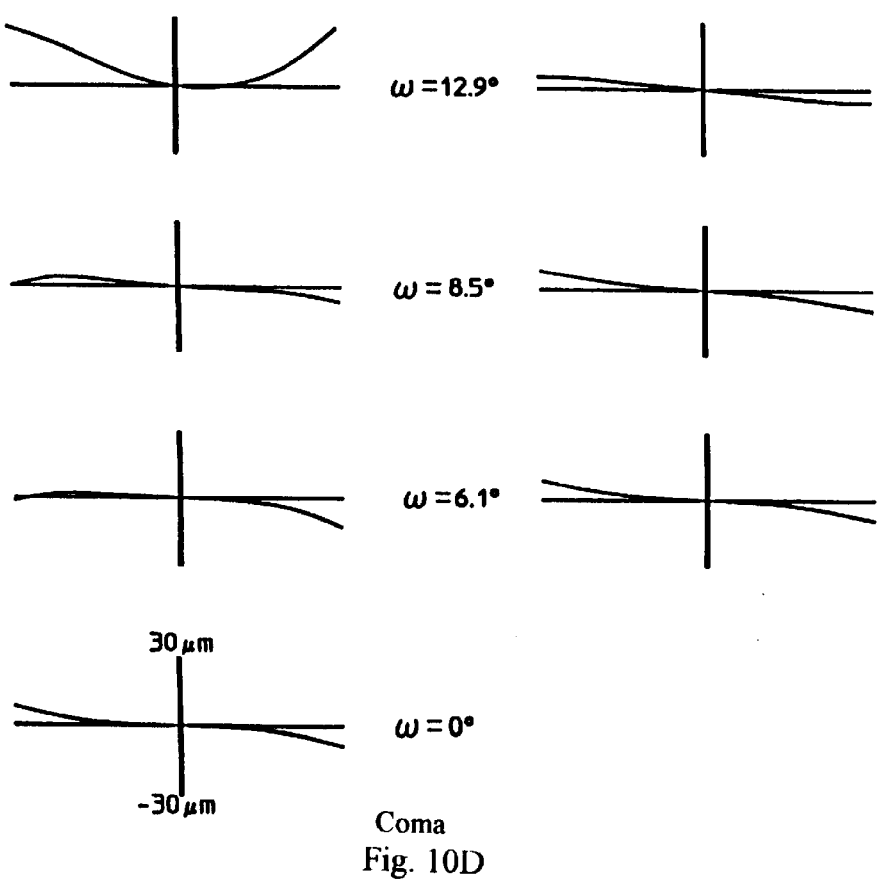
Figure 11A:
FIGS. 11A–11D show the spherical aberration, astigmatism, distortion and coma, respectively, of the color image readout lens of Embodiment 3 at a magnification of −0.85.
Figure 11B:
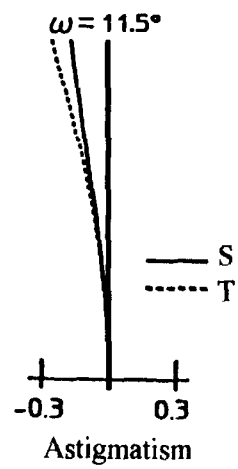
Figure 11C:
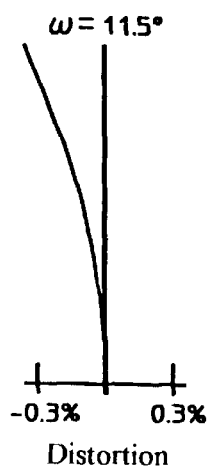
Figure 11D:
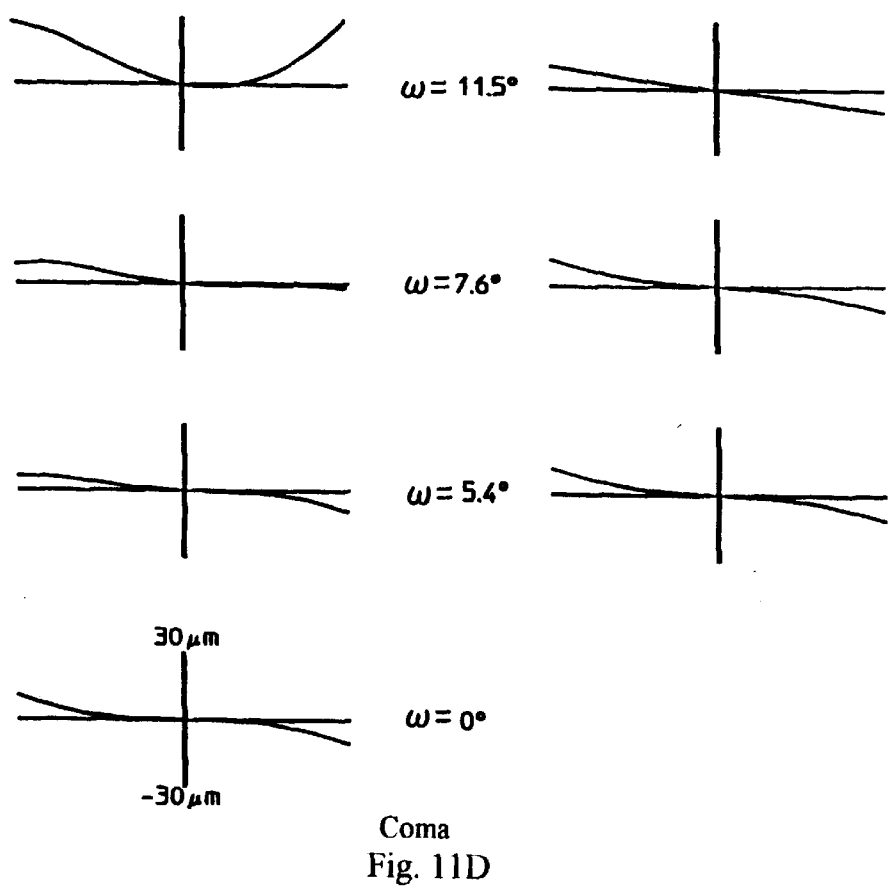

FIGS. 9A–9D show the spherical aberration, astigmatism, distortion and coma, respectively, of the color image readout lens of Embodiment 3 at a magnification of −0.27, FIGS. 10A–10D show these same aberrations, respectively, at a magnification of −0.62, and FIGS. 11A–11D show these same aberrations, respectively, at a magnification of −0.85. In these figures ω is the half-image angle. The spherical aberration is given for the three visible wavelengths R, G, B and the one near-infrared wavelength IR as indicated. In FIGS. 9B, 10B and 11B, the astigmatism is illustrated for both the sagittal S and tangential T image planes. As is evident from FIGS. 9A, 10A, and 11A, axial chromatic aberration is effectively corrected so that a color image readout lens having high performance over a wide range of wavelengths is achieved.

Embodiment 4

The color image readout lens of this embodiment is similar in basic lens element configuration to that of Embodiment 3, and thus is also shown in FIG. 1.

Table 4 below lists the surface number # in order from the object side, the radius of curvature R (in mm) of each surface, the on-axis spacing D (in mm) between surfaces, as well as the index of refraction $n_d$ and the Abbe number $v_d$ (both at the d line), the anomalous dispersion $\delta\theta$, the linear expansion coefficient $\alpha$, and the change in index of refraction with change in temperature dn/dT of each of the optical elements of Embodiment 4. In the middle portion of the table is listed the focal length f of the color image readout lens, and in the bottom portion of the table are listed the values of the above Conditions (1)–(9) which are applicable to this embodiment.

TABLE 4

| # | R | D | $n_d$ | $v_d$ | $\delta\theta$ | $\alpha$ | dn/dT |
|---|---|---|---|---|---|---|---|
| 1 | 21.456 | 2.54 | 1.64000 | 60.1 | −0.0097 | 59 | 3.4 |
| 2 | 34.931 | 0.54 | | | | | |
| 3 | 17.291 | 3.65 | 1.74400 | 44.8 | −0.0041 | 74 | 2.9 |
| 4 | −16.151 | 0.85 | 1.65412 | 39.6 | −0.0056 | 46 | 6.3 |
| 5 | 12.168 | 1.18 | | | | | |
| 6 | ∞ (stop) | 3.50 | | | | | |
| 7 | −8.480 | 0.79 | 1.61310 | 44.4 | −0.0103 | 52 | 4.9 |
| 8 | 36.342 | 3.49 | 1.60311 | 60.6 | −0.0023 | 62 | 3.0 |
| 9 | −12.032 | 0.24 | | | | | |
| 10 | −190.590 | 2.76 | 1.64000 | 60.1 | −0.0097 | 59 | 3.4 |
| 11 | −23.889 | | | | | | | f = 43.85
Condition (1) values: $v_3$ = 39.6 $v_4$ = 44.4
Condition (2) values: $\delta\theta_3$ = −0.0056 $\delta\theta_4$ = −0.0103
Condition (3) value: $\Sigma\phi \cdot \delta\theta$ = 0.0011
Condition (4) values: $n_2$ = 1.74400 $n_3$ = 1.65412
Condition (5) value: $v_2 - v_3$ = 5.1
Condition (6) and (9) value: $(D_6 - D_5)/f$ = 0.053
Condition (7) value: $\delta P_3$ = 0.040 $\delta P_4$ = 0.048
Condition (8) values: $\chi_1 \cdot \phi_1$ = 0.66 $\chi_6 \cdot \phi_6$ = 1.27

By comparing the values listed in the bottom portion of the table with the above Conditions (1)–(9), it is evident that the above values satisfy each of Conditions (1)–(9).

Figure 12A:
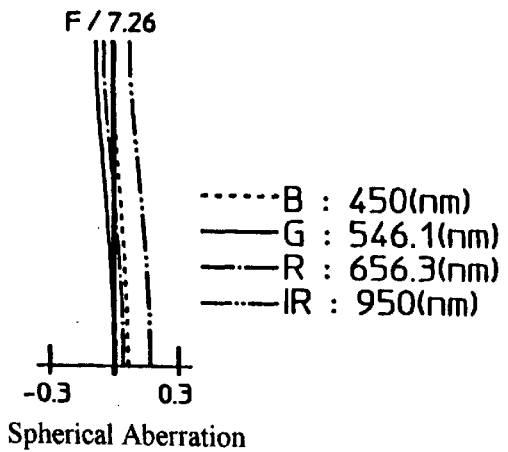
FIGS. 12A–12D show the spherical aberration, astigmatism, distortion and coma, respectively, of the color image readout lens of Embodiment 4 at a magnification of −0.27.
Figure 12B:
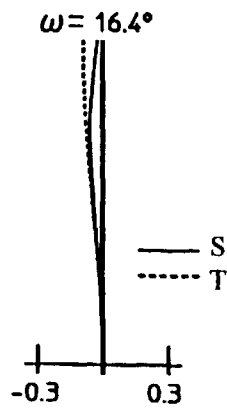
Figure 12C:
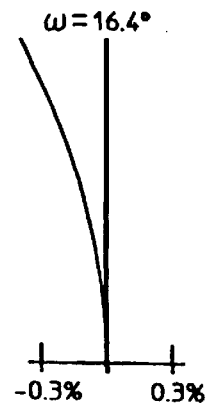
Figure 12D:
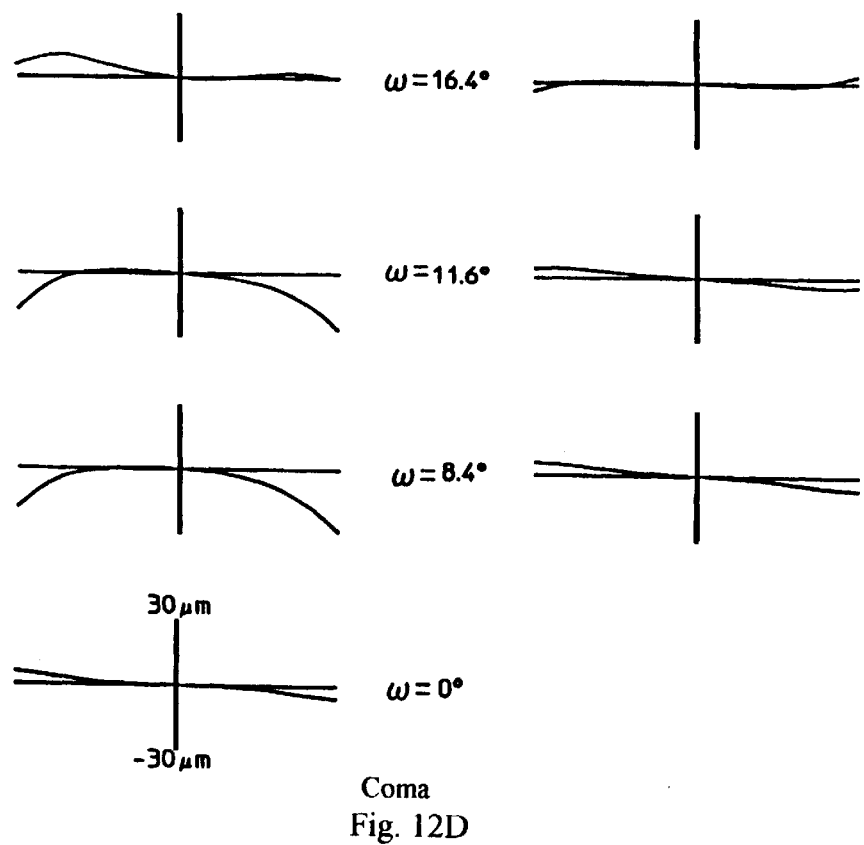
Figure 13A:
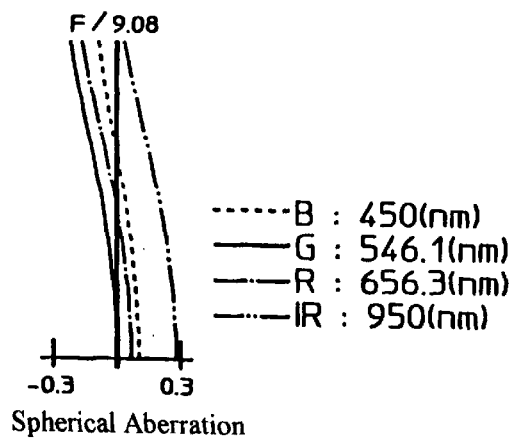
FIGS. 13A–13D show the spherical aberration, astigmatism, distortion and coma, respectively, of the color image readout lens of Embodiment 4 at a magnification of −0.62.
Figure 13B:
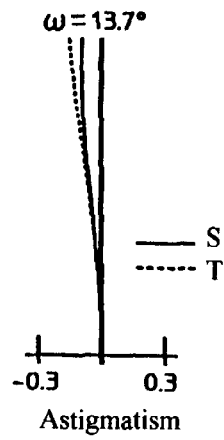
Figure 13C:
Figure 13D:
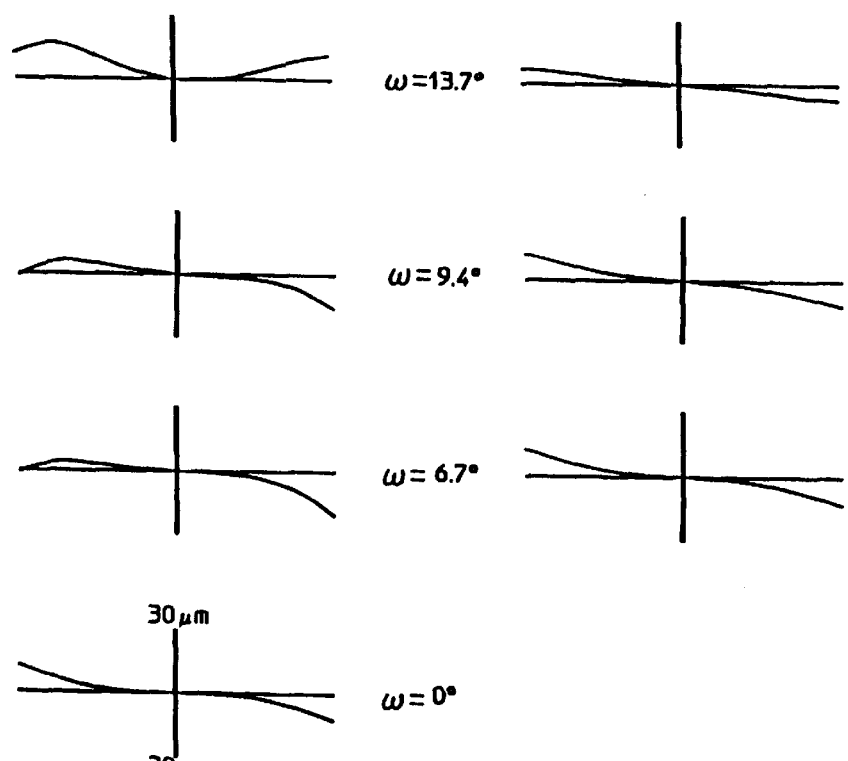
Figure 14A:
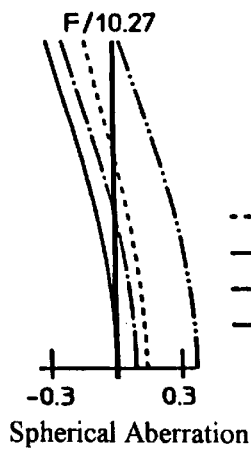
FIGS. 14A–14D show the spherical aberration, astigmatism, distortion and coma, respectively, of the color image readout lens of Embodiment 4 at a magnification of −0.85.
Figure 14B:
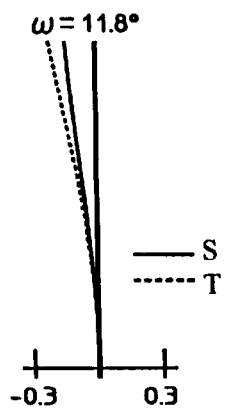
Figure 14C:
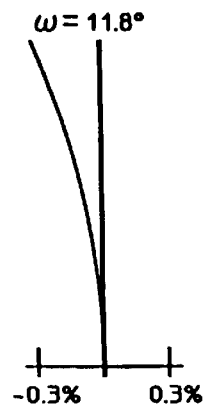
Figure 14D:
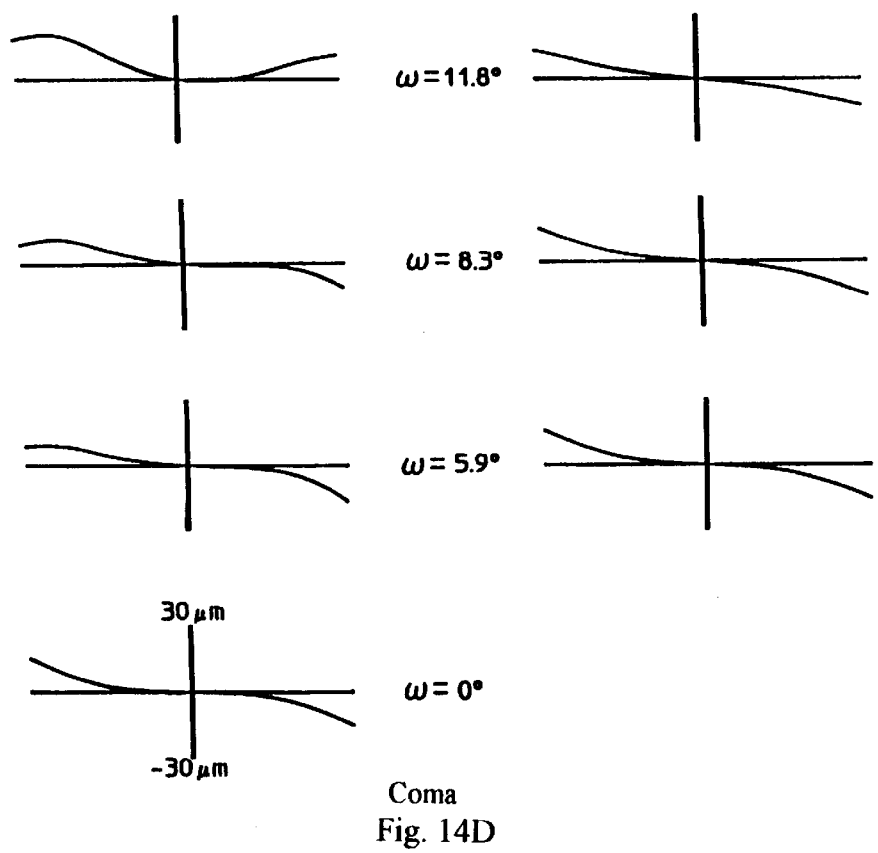

FIGS. 12A–12D show the spherical aberration, astigmatism, distortion and coma, respectively, of the color image readout lens of Embodiment 4 at a magnification of −0.27, FIGS. 13A–13D show these same aberrations, respectively, at a magnification of −0.62, and FIGS. 14A–14D show these same aberrations, respectively, at a magnification of −0.85. In these figures ω is the half-image angle. The spherical aberration is given for the three visible wavelengths R, G, B and the one near-infrared wavelength IR as indicated. In FIGS. 12B, 13B and 14B, the astigmatism is illustrated for both the sagittal S and tangential T image planes. As is evident from FIGS. 12A, 13A, and 14A, axial chromatic aberration is effectively corrected so that a color image readout lens having high performance over a wide range of wavelengths is achieved.

Figure 15:
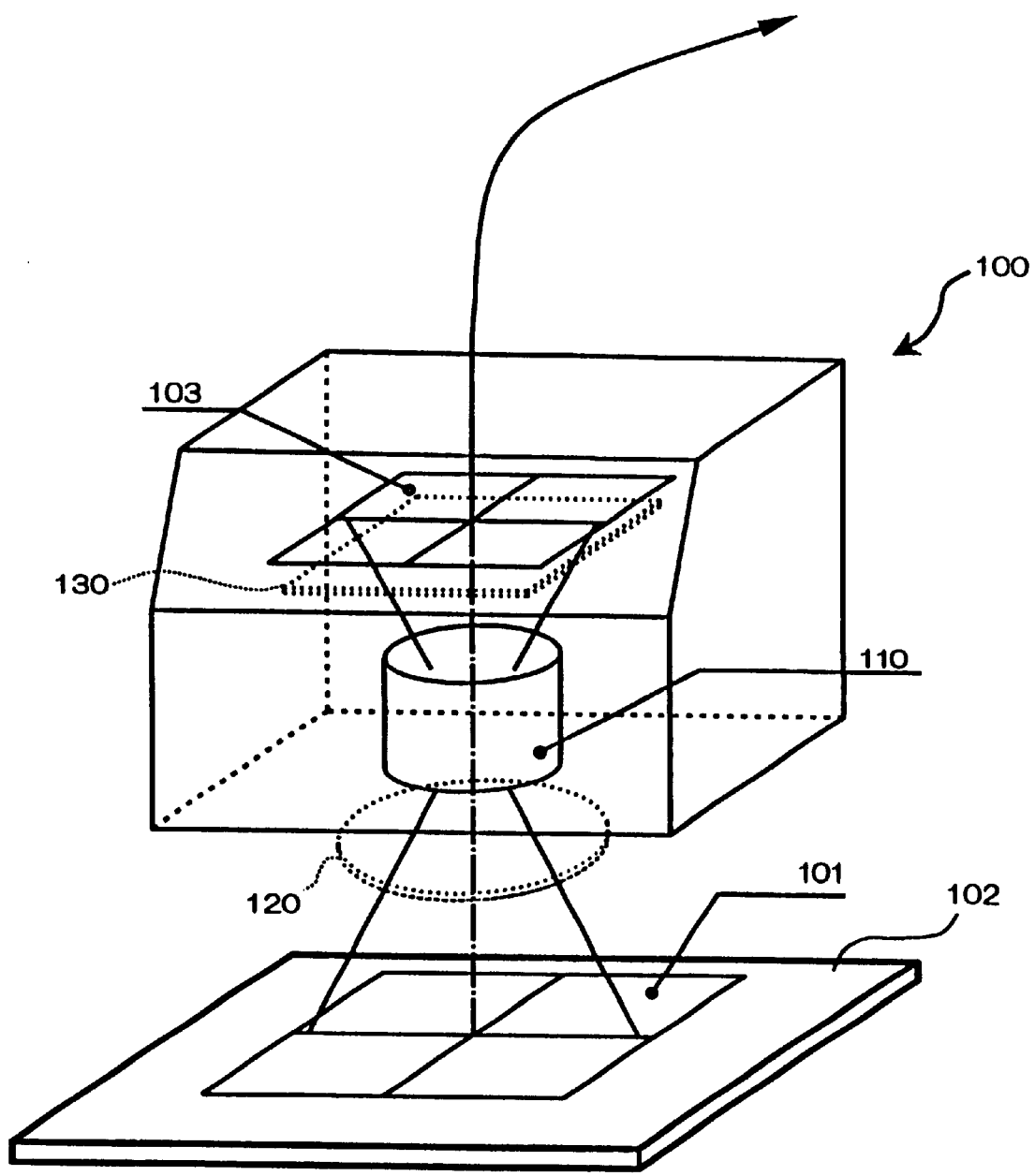
FIG. 15 is a schematic diagram which shows an image readout device that uses the color image readout lens of the present invention.

FIG. 15 is a schematic diagram which illustrates the color image readout lens of the invention when incorporated into a color image readout device. The color image readout device 100, for example, is provided with a stage 102 which supports an original 101 (such as a negative film or a positive film), an image pick-up element 103 such as a light measuring element for measuring the light intensity at three colors of an original image, and an image readout lens 110 by which image information from the original 101 is imaged onto the image pick-up element 103. In this image readout device 100, an optical member 120 such as a pressing glass or a color filter, etc. may be arranged between the original and the image readout lens 110, as needed. Moreover, an optical member 130, such as a cover glass for protecting the color filter, may be arranged between the image readout lens 110 and the image pick-up element 103. In FIG. 15, the arrow at the top of the figure represents the electrical output from the image pick-up element, which is connected to a TV monitor or image data storage medium.

The invention being thus described, it will be obvious that the same may be varied in many ways. For example, the lens element shapes, radii of curvature, axial spacings, refractive index, Abbe number, anomalous dispersion, linear expansion coefficient, rate of change of refractive index with temperature, etc. of the lens elements can be varied so long as the above conditions are satisfied. For example, the first lens group can be a biconvex lens. Also, the image readout device of the present invention is not restricted to the use of a color image readout lens as set forth in the above embodiments. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A color image readout lens comprising four lens groups of positive, positive or negative, negative, and positive refractive power, respectively, in order from the object side, as follows:

a first lens group formed of only a single lens element, said single lens element having a convex surface on the object side;

a second lens group formed of, in order from the object side, a biconvex lens element that is cemented to a biconcave lens element;

a stop;

a third lens group formed of, in order from the object side, a fourth lens element that is cemented to a fifth lens element, with the fifth lens element having positive refractive power and a convex surface on the image side; and a fourth lens group formed of a single lens element having a convex surface on the image side;

wherein the following Conditions (1) to (6) are satisfied $$33 < \nu_i < 45 \qquad \text{Condition (1)}$$

$$-0.012 < \delta\theta_i < -0.004 \qquad \text{Condition (2)}$$

$$0.0006 < \Sigma\phi_i \cdot \delta\theta_i < 0.0020 \qquad \text{Condition (3)}$$

$$n_2 > n_3 \qquad \text{Condition (4)}$$

$$5 < \nu_2 - \nu_3 < 15 \qquad \text{Condition (5)}$$

$$0.02 < (D_6 - D_5)/f < 0.08 \qquad \text{Condition (6)}$$

where $\nu_i$ is the Abbe number of the $i^{th}$ lens element, in order from the object side, with i=3, 4;

$\delta\theta_i$ is the anomalous dispersion of the $i^{th}$ lens element, in order from the object side, with i=3,4;

$\Sigma\phi_i \cdot \delta\theta_i$ represents the sum of the products of the refractive power and anomalous dispersion of the $i^{th}$ lens elements, in order from the object side, with i=3, 4;

$n_2$ is the refractive index of the second lens element, in order from the object side;

$n_3$ is the refractive index of the third lens element, in order from the object side; and $\nu_2$ is the Abbe number at the d line of the second lens element, in order from the object side, $\nu_3$ is the Abbe number at the d line of the third lens element, in order from the object side, $D_5$ is the distance between the third lens element, in order from the object side, and the stop, and $D_6$ is the distance between the stop and the fourth lens element, in order from the object side.

2. The color image readout lens as described in claim 1, wherein the following Condition (7) is satisfied:

$$0.03 < \delta P_i < 0.06 \qquad \text{Condition (7)}$$

(i=3,4)

where, $\delta P_3$ is the anomalous dispersion of the negative lens element of the second lens group, in the near-infrared region of the t-line ($\lambda$=940 nm), and $\delta P_4$ is the anomalous dispersion of the negative lens element of the third lens group, in the near-infrared region of the t-line ($\lambda$=940 nm).

3. The color image readout lens described in claim 1, wherein two or more lens elements of the four positive lens elements of the first lens element, the second lens element, the fifth lens element and the sixth lens element satisfy the following Condition (8):

$$\chi_i \cdot \phi_i < 2.6 \qquad \text{Condition (8)}$$

where the subscript i represents the lens elements 1, 2, 5 or 6 and the condition is satisfied if two lens elements or more are within the above limit of 2.6, $\phi_i$ is the refractive power (equals $1/f_i$) of the $i^{th}$ lens element, in order from the object side (i=1,2,5, or 6), $\chi_i$ is the temperature coefficient of the lens element, defined by the following equation $$\chi_i = \alpha_i - (dn/dT)_i \cdot (1/(n_i-1))$$

with $\alpha_i$ being the linear expansion coefficient of the $i^{th}$ lens element, in order from the object side (i=1, 2, 5, or 6), $(dn/dT)_i$ being the change of refractive index with temperature, of the $i^{th}$ lens element, in order from the object side (i=1, 2, 5, or 6), and $n_i$ being the index of refraction of the $i^{th}$ lens element, in order from the object side (i=1, 2, 5, or 6).

4. The color image readout lens described in claim 2, wherein two or more lens elements of the four positive lens elements of the first lens element, the second lens element, the fifth lens element and the sixth lens element satisfy the following Condition (8):

$$\chi_i \cdot \phi_i 21\ 2.6 \qquad \text{Condition (8)}$$

where the subscript i represents the lens elements 1, 2, 5 or 6 and the condition is satisfied if two lens elements or more are within the above limit of 2.6, $\phi_i$ is the refractive power (equals $1/f_i$) of the $i^{th}$ lens element, in order from the object side(i=1, 2, 5, or 6), $\chi_i$ is the temperature coefficient of the lens element, defined by the following equation $$\chi_i = \alpha_i - (dn/dT)_i \cdot (1/(n_i-1))$$

with
- $\alpha_i$ being the linear expansion coefficient of the $i^{th}$ lens element, in order from the object side (i=1, 2, 5, or 6),
- $(dn/dT)_i$ being the change of refractive index with temperature, of the $i^{th}$ lens element, in order from the object side (i=1, 2, 5, or 6), and
- $n_i$ being the index of refraction of the $i^{th}$ lens element, in order from the object side (i=1, 2, 5, or 6).

5. The color image readout lens as set forth in claim 1, in combination with an image readout device that includes an image pick-up element.

6. The color image readout lens as set forth in claim 2, in combination with an image readout device that includes an image pick-up element.

7. The color image readout lens as set forth in claim 3, in combination with an image readout device that includes an image pick-up element.

8. The color image readout lens as set forth in claim 4, in combination with an image readout device that includes an image pick-up element.

* * * * *

UNITED STATES PATENT AND TRADEMARK OFFICE
CERTIFICATE OF CORRECTION

PATENT NO. : 6,650,487 B2
DATED : November 18, 2003
INVENTOR(S) : Mori

It is certified that error appears in the above-identified patent and that said Letters Patent is hereby corrected as shown below:

<u>Title page,</u>
Item [57], ABSTRACT,
Line 6, change "a convex surface of" to -- a convex surface on --;

<u>Column 4,</u>
Line 15, change "for or the" to -- for the --;

<u>Column 6,</u>
Line 62, change "performances" to -- performance --;

<u>Column 11,</u>
Line 16, change "Rather the scope" to -- Rather, the scope --;
Line 46, change to read:
-- $0.0006 < \Sigma\phi_i \cdot \delta\theta_i < 0.0020$     ... Condition (3) --;
Line 65, change "the object side; and" to -- the object side; --;

<u>Column 12,</u>
Line 55, change to read:
-- $\chi_i \cdot \phi_i < 2.6$     ... Condition (8) --.

Signed and Sealed this

Third Day of February, 2004

JON W. DUDAS
*Acting Director of the United States Patent and Trademark Office*